United States Patent [19] | [11] 4,016,425
Farquhar et al. | [45] Apr. 5, 1977

[54] METHODS AND APPARATUS FOR OPTIMIZING THE RESPONSE OF TRANSDUCERS

[75] Inventors: Robert L. Farquhar, Twyford; Phillip D. Snook, Pinner, both of England

[73] Assignee: Graviner Limited, England

[22] Filed: Nov. 5, 1975

[21] Appl. No.: 629,015

[30] Foreign Application Priority Data

Nov. 5, 1974 United Kingdom ............. 47755/74

[52] U.S. Cl. ................................ 250/372; 250/336
[51] Int. Cl.[2] ........................................... G01J 1/42
[58] Field of Search ............................ 250/372, 336

[56] References Cited

UNITED STATES PATENTS

| | | | |
|---|---|---|---|
| 3,525,907 | 8/1970 | Abromaitis | 250/372 X |
| 3,544,792 | 12/1970 | Giltaire | 250/372 |
| 3,609,364 | 9/1971 | Paine | 250/372 |

FOREIGN PATENTS OR APPLICATIONS

| | | |
|---|---|---|
| 1,110,544 | 4/1968 | United Kingdom |
| 1,116,877 | 6/1968 | United Kingdom |

*Primary Examiner*—Davis L. Willis
*Attorney, Agent, or Firm*—Leydig, Voit, Osann, Mayer & Holt, Ltd.

[57] ABSTRACT

Methods and apparatus for optimizing the response of a radiation detecting device such as a cold cathode discharge tube are disclosed. The tube is energized at each instant of repeated sequences of successive time instants which are fixed in time relative to a time datum, and held energized for not more than a respective activation period following each said instant, consecutive activation periods being mutually separated by recuperation time periods. Response of the device during each of the activation periods is sensed for, and a warning output is produced only when the device responds during each of the activation periods of at least one sequence. The lengths and number of activation periods during each sequence are selected to increase the probability of a warning output being produced in response to radiation of a predetermined wavelength relative to the probability of a warning output being produced in response to background radiation.

18 Claims, 6 Drawing Figures

METHODS AND APPARATUS FOR OPTIMIZING THE RESPONSE OF TRANSDUCERS

The invention relates to methods and apparatus for optimising the response of sensing devices whose operation is at least in part random but with a predictable probability. By way of example only, a radiation detecting device, in which an avalanche action takes place under certain conditions in response to radiation, may be given as one form of such a sensing device; such radiation detecting devices may be gas discharge devices or solid state avalanche detectors of the PIN type, for example, and a more specific example is a cold cathode gas discharge tube responsive to ultra-violet radiation. More specifically, therefore; though by no means exclusively, the invention relates to methods and apparatus for optimising the response of cold cathode gas discharge tubes to ultra-violet radiation.

Cold cathode gas discharge tubes arranged to respond to ultra-violet radiation may be used as flame detectors such as, for example, for detecting the presence of fire or for providing a flame warning such as due to malfunction in combustion equipment or an aircraft engine. In any such application, it is desirable to ensure sufficient sensitivity to provide the required response of the detector tube to the flame but at the same time to minimize its possible response to other sources of ultra-violet radiation such as solar radiation or to cosmic radiation.

According to the invention, there is provided a method of optimising the response of a sensing device whose operation is at least in part random but has a predictable probability, comprising the steps of rendering the device active at each instant of repeated sequences of successive time instants which are fixed in time relative to a time datum and holding the device active for not more than a respective activation period following each instant, consecutive activation periods being mutually separated by recuperation time periods, all the said periods being of predetermined lengths, and producing a warning output only when the device responds during each one of the activation periods in at least one said sequence, the lengths and number of activation periods in each sequence being selected such as to increase the signal to noise ratio of the device.

According to the invention, there is further provided a method of optimising the response of a radiation detecting device, comprising the steps of energising the device at each instant of repeated sequences of successive time instants which are fixed in time relative to a time datum, holding the device energised for not more than a respective activation period following each said instant, consecutive activation periods being mutually separated by recuperation time periods, all the said periods being of predetermined lengths, sensing for response of the device during each of the activation periods, and producing a warning output only when the device responds during each of the activation periods of at least one said sequence, the lengths and number of activation periods during each said sequence being selected such that the probability of a warning output being produced in response to radiation of a predetermined wavelength is increased relative to the probability of a said warning output being produced in response to background radiation.

According to the invention, there is also provided apparatus for optimising the response of a sensing device whose operation is at least in part random but has a predictable probability, comprising means for rendering the device active at each instant of repeated sequences of successive time instants fixed in time relative to a time datum and for holding the device active for not more than a respective activation period following each instant, consecutive activation periods being mutually separated by recuperation time periods, all the said periods being of predetermined lengths, means operative to produce a warning output only when the device responds during each one of the activation periods in at least one said sequence, the lengths and number of activation periods in each sequence being selected such as to increase the signal to noise ratio of the device.

According to the invention, there is still further provided apparatus for optimising the response of a radiation detecting device, comprising means for energising the device at each instant of repeated sequences of successive time instants which are fixed in time relative to a time datum, means operative to hold the device energised for not more than a respective activation period following each said instant, consecutive activation periods being mutually separated by recuperation time periods, all the said periods being of predetermined lengths, means for sensing for response of the device during each of the activation periods, and output means operative to produce a warning output only when the device responds during each of the activation periods of at least one said sequence, the lengths and number of activation periods during each said sequence being selected such that the probability of a warning output being produced in response to radiation of a predetermined wavelength is increased relative to the probability of a said warning output being produced in response to background radiation.

Methods and apparatus according to the invention, for improving the signal to noise ratio of cold cathode gas discharge tubes arranged for detecting ultra-violet radiation from flames and the like, will now be described, by way of example only, with reference to the accompanying diagrammatic drawings in which.

The striking voltage ($V_s$) of a gas discharge tube can be defined as that voltage at which the probability of the tube avalanching to currents greater than 1 $\mu$A due to the release of electrons from the cathode and the subsequent ionisation of the gas under the field effect, goes from zero to a finite value. In other words, when the probability has such a finite value, it follows that if a voltage $\Delta V$ is added to $V_s$, where $\Delta V$ is very small, then eventually (after a time $t_s$, which may be several minutes, has elapsed), the tube will avalanche — that is, a gas discharge will occur. This time lag $t_s$ is known as (and hereinafter referred to as) the "statistical time lag" for that tube with the particular intensity and wavelength bandwidth of radiation present. The statistical nature of the process is due to the statistical fluctuations in the physical processes of emission and ionisation.

As ΔV is increased, the time lag before the tube fires, in response to a given ultra-violet radiation stimulus, falls, and consequently the probability increases.

Figure 1:
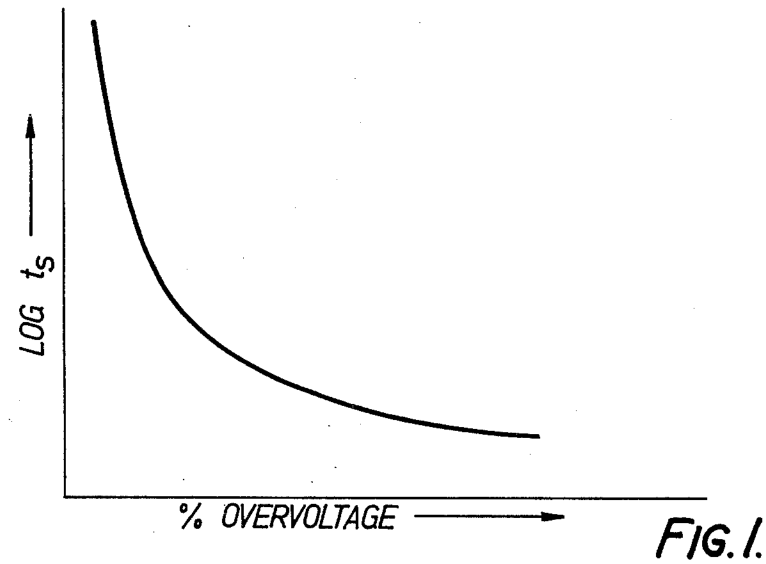
FIGS. 1, 2 and 3 are graphs showing certain characteristics of such gas discharge tubes for use in explaining operation of the methods, apparatus and circuitry.

FIG. 1 shows a graph of statistical time lag $t_s$ plotted against percentage overvoltage, that is, the difference between the applied voltage and the striking voltage $V_s$ expressed as a percentage of the striking voltage. The curve shown is strictly by way of example and its shape will depend to some extent on the type of tube — that is, whether it has planar or filament type electrodes. FIG. 1 shows that the statistical time lag $t_s$ becomes substantially constant when the percentage overvoltage exceeds a predetermined minimum.

The basic equation is $$t_s = 1/PN_o \quad (1)$$

where $P$ is the probability of avalanching, and $N_o$ is the number of electrons escaping per unit time from the cathode per photon of ultra-violet light acting on the cathode. It can also be shown that if breakdown is measured for N separate applications of pulse length of $t$ of a given voltage across the tube, and the number n of breakdowns is counted and plotted against $t$, an exponential relationship of the form $$1 - (n/N) = \exp.(-t/t_s) \quad (2)$$

is obtained. In other words, the probability of a discharge occurring in a time $t$ is given by $$P = 1 - \exp.(-t/t_s) \quad (3)$$

Figure 2:
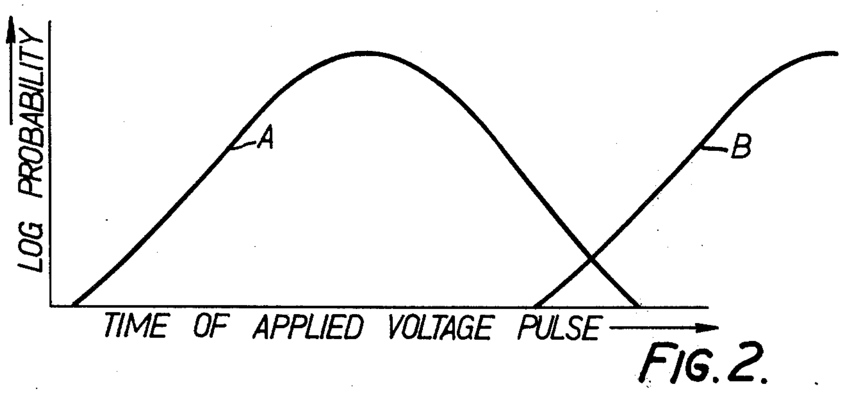

FIG. 2 is a graph showing probability P plotted against time duration of the applied pulse for a particular tube. The curve A is for ultra-violet radiation emitted from a flame, while curve B is that for solar radiation.

The circuit arrangement now to be described with reference to FIG. 4 utilizes the effects described above and increases the probability of obtaining a warning in response to appearance of a flame, relative to the probability of obtaining a warning in response to solar radiation.

Figure 3:
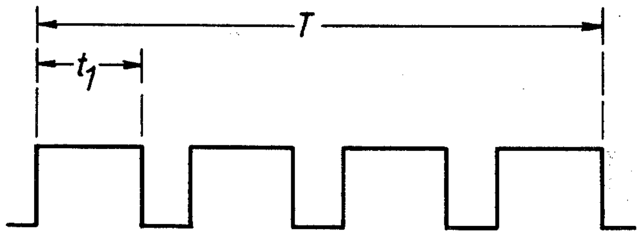

The circuit arrangement to be described applies to the tuoe consecutive pulse sequence each of a predetermined number of voltage phases, each voltage phase having a magnitude which sufficiently exceeds the striking voltage ($V_s$) so as to give a stable value of statistical time lage $t_s$ — see FIG. 1. Such a pulse sequence is shown in FIG. 3 and comprises, in this example, four pulses. The circuit arrangement is arranged to produce a warning output only when the tube is detected to fire within each voltage pulse of a single sequence of successive pulses. In a manner now to be described, the lengths of the pulses in each sequence and the number of pulses in each sequence are selected such that the probability of a warning being given in response to a flame is increased relative to the probability of a warning being given in response to solar radiation.

In the following Example, it will be assumed that the mean statistical time lags, $t_{s1}$ for solar radiation and $t_{s2}$ for the particular type of flame, have been measured for a particular tube with the following results:

$$t_{s1} = 5 \text{ seconds}, \quad (4)$$

and $$t_{s2} = 20 \text{ milliseconds} \quad (5)$$

It will further be assumed that it is desired that on average there should not be more than one false warning (that is, a warning in response to solar radiation) every 3 years. Finally, it will be assumed initially, for the purposes of subsequent calculation, that the circuit arrangement uses pulse sequences as shown in FIG. 3, that is, containing four successive pulses.

Then, if T is the total length of a sequence of four of the pulses, the probability $P_1$ of the tube firing during any given period T during the three years will be $$P_1 = T/3 \text{ years} \quad (6)$$

Substituting in Equation (6) for $T = 4t_1 + t_o$ (where $t_o$ is the total time during each period $T$ when the voltage is at the base level) and 3 years $= 9.46 \times 10^7$ seconds, $$P_1 = \frac{4t_1 + t_o}{9.46 \times 10^7} \quad (7)$$

Therefore, assuming $t_o$ is small with respect to $t_1$, $$P_1 = \frac{4t_1}{9.46 \times 10^7} \quad (8)$$

From Equation (8), it follows that $P_2$, the probability of the tube firing in any given interval $t_1$, must be $$P_2 = \sqrt[4]{\frac{4t_1}{9.46 \times 10^7}} \quad (9)$$

However, from Equation (3) above, $P_2 = 1 - \exp(-t_1/t_s)$. Therefore, $$1 - \exp(-t_1/t_s) = \sqrt[4]{\frac{4t_1}{9.46 \times 10^7}} \quad (10)$$

From Equation (10), therefore, $t_1$ can be calculated for the solar radiation condition and is found to be approximately 30 milliseconds.

Therefore, if the pulse width is set to 30 milliseconds and the circuitry is such that an output is produced only when the tube fires in each of four successive pulses, there will, on average, be produced only one warning output in response to solar radiation every 3 years.

The response of the tube to the flame can now be calculated from the values $t_{s2} = 20$ milliseconds and $t_1 = 30$ milliseconds.

From Equation (3) above, the probability $P_3$ of the tube firing during a pulse $t_1$ when the flame is present will be $$P_3 = 1 - \exp(-0.030/0.020)$$

$$= 0.777$$

Therefore, there is a 77.7% chance that the tube will fire during a 30 millisecond duration when the flame is present.

However, as explained above, the system is arranged to produce an output warning only in response to the tube firing during each one of four consecutive pulses $t_1$. The probability $P_4$, of this occurring in response to the flame when present is given by $$P_4 = (P_3)^4$$

$$= (0.777)^4$$

$$= 0.364$$

Therefore, there is a 36.4% chance of producing an output warning (when a flame is present) during any given period of four successive pulses, that is, during any given period of length 0.12 seconds (ignoring the dead time, $t_0$, of each cycle). From this time it follows that a greater length of time, or number of complete pulse sequences, must be allowed to lapse in the presence of a flame in order to ensure statistically that a warning signal will be given in response to the flame; for example, in a time length of 1 second from commencement of flame, there will be a 97.6% chance of producing an output warning, and at a time length of 4 seconds from the commencement of flame there will be a 99.9999% chance of producing an output warning.

The above Example therefore shows how the performance of a detecting system of rather poor characteristics (a signal to noise ratio of 250:1) has been improved to the extent that a circuit using the detecting tube will on average give only one false warning (in response to solar radiation) every three years while it will have a 99.9999% chance of warning in the presence of the flame in less than four seconds.

The calculations given above will make clear how the parameters of the system, such as the number of pulses in each sequence and their lengths, should be varied in dependence on the characteristics of a particular tube in order to achieve a desired signal to noise ratio.

Figure 4:
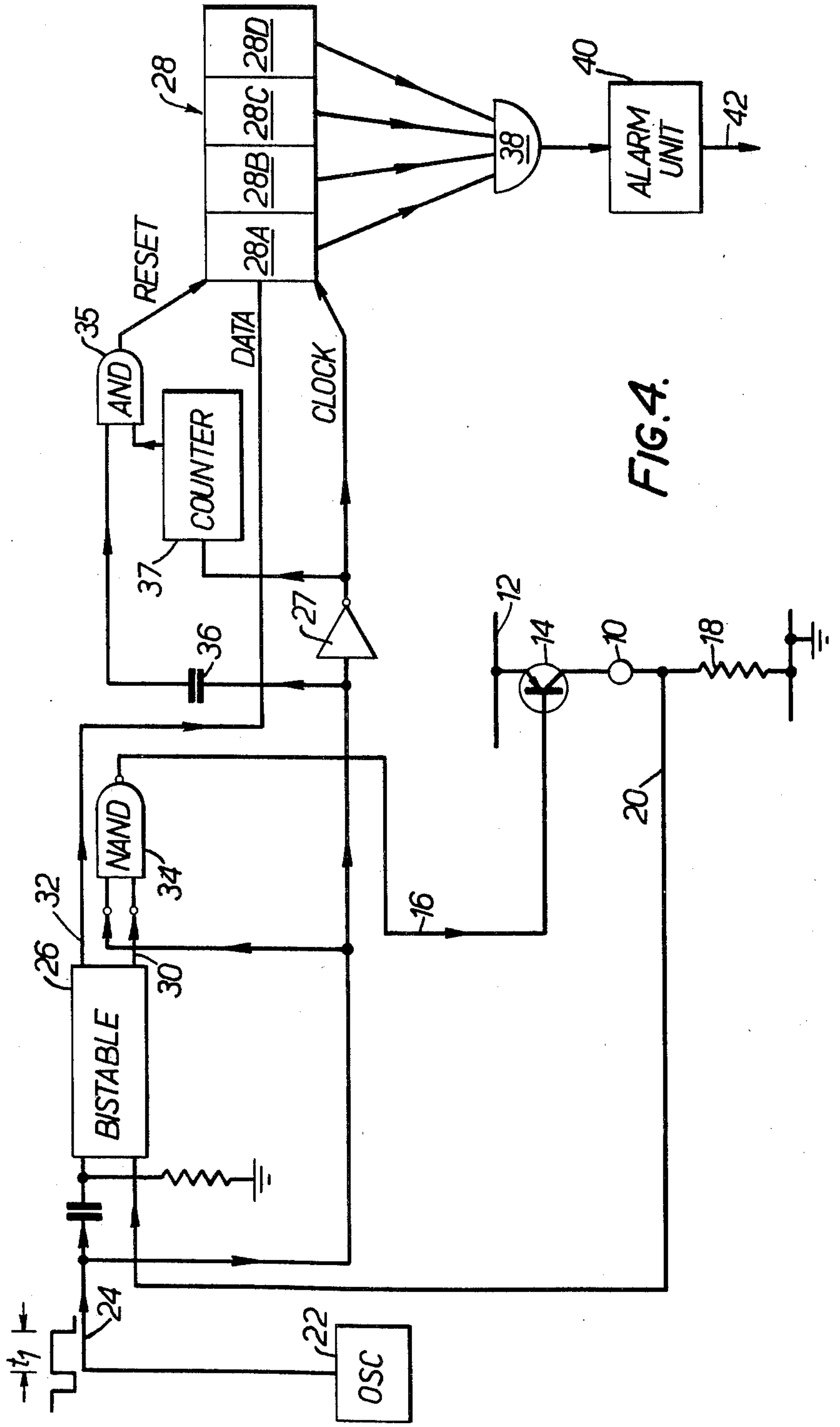
FIG. 4 is a block diagram of one form of the circuitry.

FIG. 4 illustrates in block diagram form an example of circuitry for implementing the system described above with reference to FIG. 3.

As shown in FIG. 4, the gas discharge detector tube 10 is connected to be fed with d.c. voltage from a line 12 via a series pnp transistor 14. Therefore, when the transistor 14 is rendered conductive by a signal at its base on a line 16, high voltage is applied across the tube 10. The resultant current flow through a series resistor 18 produces an output signal on a line 20.

The circuit arrangement is controlled by an oscillator 22 which produces a continuous waveform on an output line 24 as shown. The line 24 is connected to the RESET input of a bistable unit 26 and also, via an inverter 27, to the CLOCK input of a shift register 28 which has four stages 28A to 28D.

The bistable circuit 26 has two output lines 30 and 32. Line 30 carries a 1 output when the bistable circuit 26 is in the RESET state and at the same time line 32 carries a 0 output. When the bistable circuit is switched to the SET state, by means of a signal on the line 20, the state of the output lines 30 and 32 reverse.

The bistable circuit output line 30 is connected to one input of a NAND gate 34 whose other input is energised from the line 24 with the oscillator output. The output of the NAND gate 34 is connected to the base of transistor 14 by means of line 16.

The bistable circuit output line 32 is connected to a DATA input of the shift register 28.

A RESET input of the shift register 28 is fed from an AND gate 35. One of the AND gate inputs is fed through a capacitor 36 from the line 24 while the other is controlled by a counter 37 which count the inverted clock pulses output by the inverter 27.

The four stages 28A to 28D of the shift register 28 are respectively connected to the four inputs of an output AND gate 38, and the output of this AND gate energises an ALARM unit 40.

In operation the oscillator 22 repeatedly produces the output shown. At the leading edge of the first pulse $t_1$, the oscillator output on the line 24 switches the bistable circuit 26 into the RESET state via a positive pulse transmitted by a series capacitor, and the two 1 inputs to the gate 34 cause the latter to produce a 0 output on line 16 which renders transistor 14 conductive. The high voltage is therefore applied across the tube 10.

If during this pulse $t_1$, the detector tube 10 fires, then a pulse will be sensed by the line 20 and will switch the bistable circuit 26 into the SET state. The states of the output lines 30 and 32 of the bistable circuit 26 will therefore reverse. The output of the NAND gate 34 therefore changes to a 1 level thus switching off the transistor 14 and removing the voltage from across the tube 10. In addition the line 32 will apply a 1 input to the DATA line of the shift register 28. This signal will have no immediate effect on the shift register since there is no CLOCK input at this time.

When the oscillator output reverts to a low level at the end of the first pulse $t_1$, the state of the bistable circuit 26 does not change and transistor 14 therefore remains switched off. However, the CLOCK input of the shift register 28 is energised through the inverter 27, and the 1 signal which is at this time on the DATA input of the shift register 28 causes stage 28A to be switched into the 1 state.

When the second pulse $t_1$ begins, bistable circuit 26 is switched into the RESET state. The output of the NAND gate 34 therefore goes to 0 and switches on the transistor 14 again. A high voltage is therefore once more applied across the tube 10.

If the tube should fire during the second cycle, the resultant signal on line 20 switches the bistable circuit 26 once more into the SET state and again produces a 1 signal on the DATA input to the shift register 28 and also causes the NAND gate 34 to switch off the transistor 14. At the end of the pulse $t_1$, when the oscillator output falls, once more the inverter 27 produces a 1 signal at the CLOCK input to the shift register 28. This shifts the 1 state of stage 28A to stage 28B but maintains stage 28A in the 1 state.

This sequence of operations continues until, immediately after the end of four cycles of oscillator output, all four stages 28A to 28D of the shift register 28 will be in the 1 state, assuming that the detector tube 10 has fired during each pulse $t_1$ of the four cycles. Therefore, the AND gate 38 will energise the output line 42 with an ALARM signal via alarm unit 40.

The bistable circuit 26, whose state is reversed immediately the tube 10 fires, ensures that the voltage across the tube is removed substantially immediately after the tube has fired, and therefore prevents the tube from firing twice during any single pulse $t_1$.

The gaps in the oscillator output between successive pulses $t_1$ are selected to be sufficient (even if the tube 10 should fire near the end of a pulse $t_1$) to allow complete de-ionisation in the tube 10 so that proper datum conditions will be reestablished in the tube by the beginning of the next pulse $t_1$.

The counter 37 counts the CLOCK pulses fed to register 28 and produces an output when four such pulses have been received. This output enables AND gate 35 which passes a positive spike corresponding to the positive-going edge of the next oscillator pulse. This spike resets the register to zero ready for the next sequence of four clock pulses.

If during any of the sequences of four pulses, there should be no gas discharge occurring in the tube 10 during any pulse $t_1$, then the corresponding register stage will not be set and the AND gate 38 cannot receive its four required inputs during that sequence.

Figure 5:
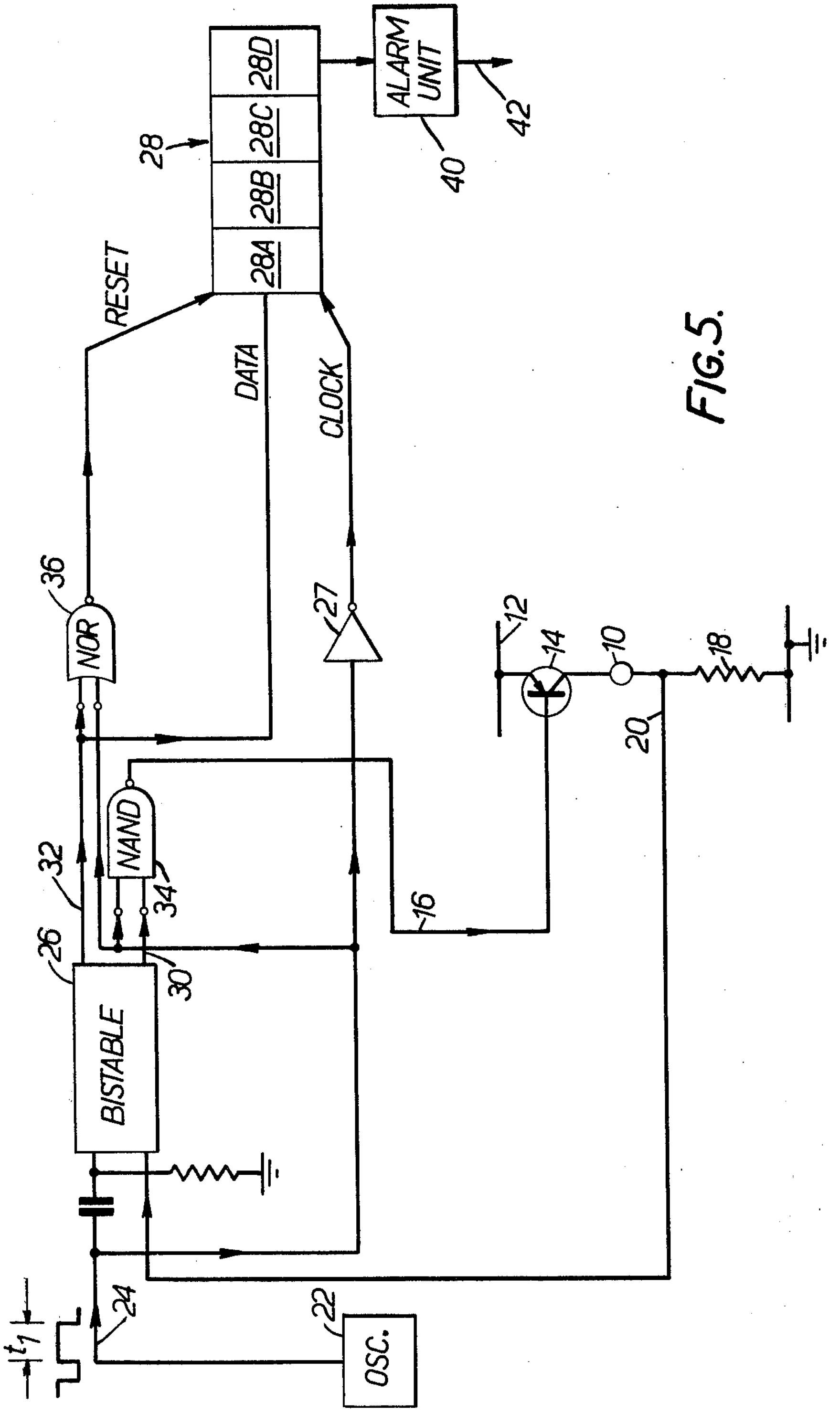
FIG. 5 is a block diagram of a modified form of the circuitry.

FIG. 5 shows a modified form of the circuit of FIG. 4 and parts in FIG. 5 corresponding to parts in FIG. 4 are correspondingly referenced. The arrangement of FIG. 5 differs in that failure of the tube 10 to fire during any pulse $t_1$ causes immediate reset of the shift register 28 which thus immediately starts a fresh sequence of four pulses (instead of, as in the circuit of FIG. 4, continuing to the end of the current sequence before restarting). The circuit of FIG. 5 therefore does not follow the above-mentioned theory of operation exactly, but the probability calculation is not substantially different.

In FIG. 5, the bistable circuit output line 32 is connected not only to the DATA input of the shift register 28 but also to one input of a NOR gate 36. The other input of the NOR gate 36 receives the oscillator output on the line 24, and the output of this NOR gate is connected to the RESET input of the shift register 28.

The last stage, stage 28D, of the shift register 28 is connected directly to the alarm unit 40.

In operation, the circuit of FIG. 5 responds to firing of the detector tube 10 in the same way as does the circuit of FIG. 4.

However, if at any time while at least one of the stages 28A to 28C is in the 1 state, there should be no gas discharge occurring in the tube 10 during the next following pulse $t_1$, the bistable circuit 27 will not be SET. Consequently, the NOR gate 36 will produce a 1 signal to the RESET input of the shift register 28 when the oscillator output falls immediately after the end of that pulse. The shift register 28 will thus be reset and the detection sequence will restart from the beginning.

In either circuit, the alarm unit 40 may be provided with means to hold it in the ALARM condition, once set, until reset.

Circuitry may be provided to indicate failure of high voltage supply to the detector tube. Additionally, a U.V. test source may be mounted near the detector tube and arranged to be operable remotely to fire the detector tube at such a rate as to operate the alarm unit 40 if the circuit is functioning correctly.

The circuitry may be designed in modular form so as to enable rapid variations in, for example, the oscillator output frequency and the number of pulses in each sequence. In this way, the circuit can be adapted to have the optimum configuration for any particular application.

Some of the factors influencing the circuit parameters will now be considered in more detail. Some of the factors are determined by the particular application of the equipment, some by the user's requirements, and some are within the control of the circuit designer, as follows:

a. Statistical lag in response to solar radiation ($t_{s1}$). This depends on the environment in which the detector tube is to be situated.

b. Statistical lag in response to radiation from the flame to be detected ($t_{s2}$). This is determined by the sensitivity of the detector tube and the size of the flame to be detected.

c. Response time (R). This is the required maximum time (fixed by the user) between the initiation of the flame (of stated size) and the production of the warning.

d. The probability of flame detection ($P_f$). This is determined by the user and is the probability of detection within the response time (R).

e. The average minimum acceptance time between false warnings ($A_w$). This is again determined by the user.

f. The number of pulses (N) in each pulse sequence of voltage pulses applied across the tube. This is controlled by the circuit designer.

g. The gate "gate time" ($T_g$), that is, the length of each pulse in each pulse sequence. This is again controlled by the circuit designer.

From Equation (3), it will be apparent that $$P_f = [1 - \exp.(-T_g/t_{s2})]^N \quad (11)$$

Similar, $P_s$, the probability of false warning, is given by $$P_s = [1 - \exp.(-T_g/t_{s1})]^N \quad (12)$$

In addition, $$A_w = \frac{N.T_g}{[1 - \exp.(-T_g/t_{s1})]^N} \quad (13)$$

and $$R = N.T_g \quad (14)$$

From Equation (11), $$ln\,[1 - (P_f).1/N] = -t_g/t_{s2} \quad (15)$$

From Equation (12), $$ln\,[1 - (P_s).1/N] = T_g/t_{s1} \quad (16)$$

From Equations (15) and (16), $$t_{s1}.ln[1 - (P_s).1/N] = t_{s2}.ln[1 - (P_f).1/N] \quad (17)$$

or $$\frac{t_{s1}}{t_{s2}} = \frac{\ln[1 - (P_f).1/N]}{\ln[1 - (P_s).1/N]} \quad (18)$$

The ratio $t_{s1}/t_{s2}$ is in reality a signal/noise ratio for a particular situation. The right hand side of the equation contains only three variables and therefore it is possible to present to the design engineer some limited information using a three-axis graph.

Figure 6:
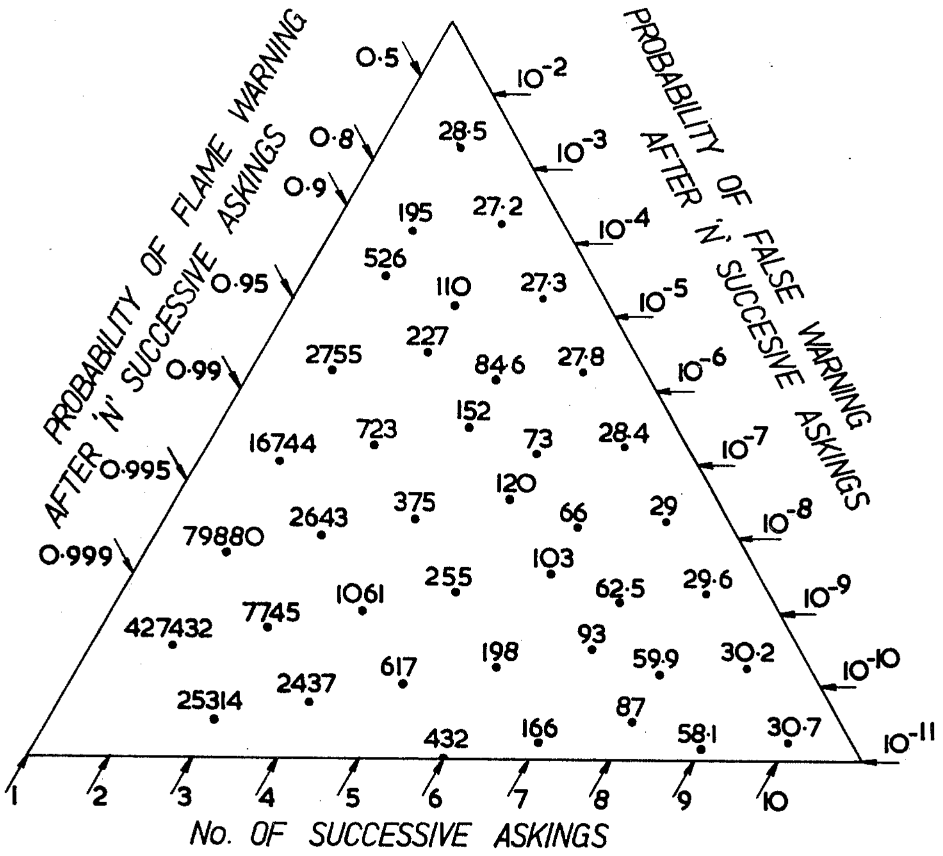
FIG. 6 is a graph for use in selecting operating parameters for the circuitry illustrated.

FIG. 6 shows such a three axis graph showing numerical information by way of example only. The left hand axis indicates values for the probability of a flame warning after N successive askings or pulses applied across the detecting tube, the small arrows indicating the direction in which these values have to be read off the graph. Similarly, the right hand axis indicates values for the probability of a false warning after N successive askings or pulses applied across the detecting tube, the small arrows on this axis indicating the direction in which these values have to be read off the graph. Finally, the bottom axis indicates values for the number of successive askings or pulses applied across the tube, the small arrows again indicating the directions in which these values have to be read off. The numerical values on the graph itself are different values for the signal to noise ratio $t_{s1}/t_{s2}$.

In use, the design engineer would know the desired value of $t_{s1}/t_{s2}$, and also the desired probability of flame and false warnings. He then has to select a point on the graph which best satisfies all these requirements. He can then read off from the bottom axis the corresponding number of successive askings or pulses which are required. Thereafter, he merely has to use Equations (11) or (12) plus (13) and (14) to solve for the gate time and the response time.

What is claimed is:

1. A method of optimising the response of a sensing device whose operation is at least in part random but has a predictable probability, comprising the steps of defining repeated sequences of successive time instants which are fixed in time relative to a time datum, rendering the device active at each instant of the said sequences, holding the device active for not more than a respective activation period following each instant, consecutive activation periods being mutually separated by recuperation time periods and all the said periods being of predetermined lengths, and producing a warning output only when the device responds during each one of the activation periods in at least one said sequence, the lengths and number of activation periods in each sequence being selected such as to increase the signal to noise ratio of the device.

2. A method of optimising the response of a radiation detecting device, comprising the steps of defining repeated sequences of successive time instants which are fixed in time relative to a time datum, energising the device at each instant of the said sequences, holding the device energised for not more than a respective activation period following each said instant, consecutive activation periods being mutually separated by recuperation time periods and all the said periods being of predetermined lengths, sensing for response of the device during each of the activation periods, and producing a warning output only when the device responds during each of the activation periods of at least one said sequence, the lengths and number of activation periods during each said sequence being selected such that the probability of a warning output being produced in response to radiation of a predetermined wavelength is increased relative to the probability of a said warning output being produced in response to background radiation.

3. A method according to claim 2, including the step of selecting the lengths and number of said activation periods in each said sequence to increase the probability of a said warning being produced in response to a flame of predetermined source type and size relative to the probability of a said warning being produced in response to solar or cosmic radiation.

4. A method according to claim 3, for use where the device is a cold cathode gas discharge device responsive to ultra-violet radiation, in which the step of selecting the lengths and number of activation periods in each said sequence is carried out by a. determining for the said device the statistical lag ($t_{s1}$) in response to solar or cosmic radiation in the environment in which the device is to operate, b. determining for the said device the statistical lag ($t_{s2}$) in response to the flame to be detected, c. determining from the ratio $t_{s1}/t_{s2}$ the number (N) of activation periods in the said sequence which will satisfy the relationship $$\frac{t_{s1}}{t_{s2}} = \frac{\ln[\,1-(P_f)\,.1/N\,]}{\ln[\,1-(P_s)\,.1/N\,]} \qquad (18)$$

where $P_f$ and $P_s$ are the required probabilities of producing said warning outputs in response to radiation from the said flame and solar or cosmic radiation respectively, and d. determining the length ($T_g$) of the activation period from one of the relationships $$P_f = [1 - \exp.(-T_g/t_{s1})\,]$$

and $$P_s = [1 - \exp.(-T_g/T_{s2})\,]$$

5. A method according to claim 2, including the step of producing the said warning output only when the device responds during each activation period of at least a predetermined plurality of consecutive said sequences, and selecting the number in the said predetermined plurality of sequences to increase the probability of a warning output being produced in response to radiation of the predetermined wavelength relative to the probability of the warning output being produced in response to the background radiation.

6. A method according to claim 5, including the step of selecting the number of sequences in the said predetermined plurality of sequences to increase the probability of a said warning output being produced in response to a flame of predetermined source type and size relative to the probability of a said warning output being produced in response to solar or cosmic radiation.

7. A method according to claim 2, including the steps of de-energising the device immediately after it responds during any said activation period, and holding the device de-energised until the beginning of the next activation period.

8. A method according to claim 2, including the steps of discontinuing any said sequence during which there is non-response of the device during any said activation period, and then commencing a fresh sequence.

9. Apparatus for optimising the response of a sensing device whose operation is at least in part random but has a predictable probability, comprising timing means for defining repeated sequences of successive time instants fixed in time relative to a time datum of the said sequences, means rendering the device active at each instant of the said sequences and holding the device active for not more than a respective activation period following each instant, consecutive activation periods being mutually separated by recuperation time periods, all the said periods being of predetermined lengths, and output means connected to the device to produce a warning output only when the device responds during each one of the activation periods in at least one said sequence, the lengths and number of activation periods in each sequence being selected such as to increase the signal to noise ratio of the device.

10. Apparatus according to claim 9, in which the device is a radiation detecting device, and in which the lengths and number of activation periods during each said sequence are selected such that the probability of a warning output being produced in response to radiation of a predetermined wavelength is increased relative to the probability of a said warning output being produced in response to background radiation.

11. Apparatus according to claim 10, in which the length and number of said activation periods in each said sequence are selected such that the probability of a said warning being produced in response to a flame of predetermined source type and size is increased relative to the probability of a said warning being produced in response to solar or cosmic radiation.

12. Apparatus according to claim 10, in which the said output means comprises counting means connected to the said device to produce the said warning output only when the device responds during each activation period of at least a predetermined plurality of consecutive said sequences, the number in the said predetermined plurality of sequences being selected such that the probability of the warning output being produced in response to radiation of the predetermined wavelength is increased relative to the probability of the warning output being produced in response to the background radiation.

13. Apparatus according to claim 12, in which the number of sequences in the said predetermined plurality of sequences is selected such that the probability of a said warning output being produced in response to a flame of predetermined source type and size is increased to the probability of a said warning output being produced in response to solar or cosmic radiation.

14. Apparatus according to claim 10, including means operative to de-energise the device immediately after it responds during any said activation period and to hold it de-energised until the beginning of the next activation period.

15. Apparatus according to claim 10, including means for resetting the timing means to discontinue any said sequence during which there is non-response of the device during any said activation period thereof, and then activating the timing means to commence a fresh sequence.

16. Apparatus according to claim 10, in which the device is a gas discharge device.

17. Apparatus according to claim 16, in which the device is a cold cathode gas discharge device responsive to ultraviolet radiation.

18. Apparatus according to claim 10, in which the device is a solid state avalanche detector of the PIN type.

* * * * *